Oct. 28, 1969 T. E. NOAKES 3,474,831
ANTI-FRICTION SEAT FOR FLOW CONTROL
Filed Feb. 14, 1966 2 Sheets-Sheet 1
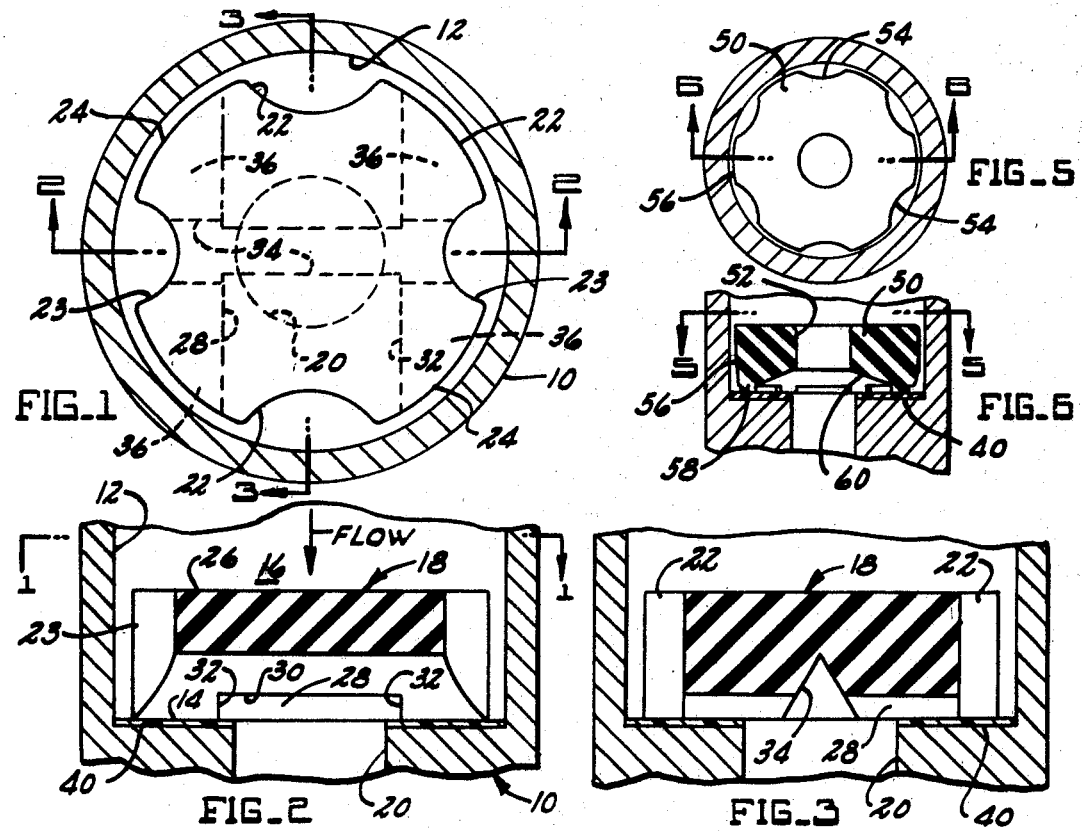
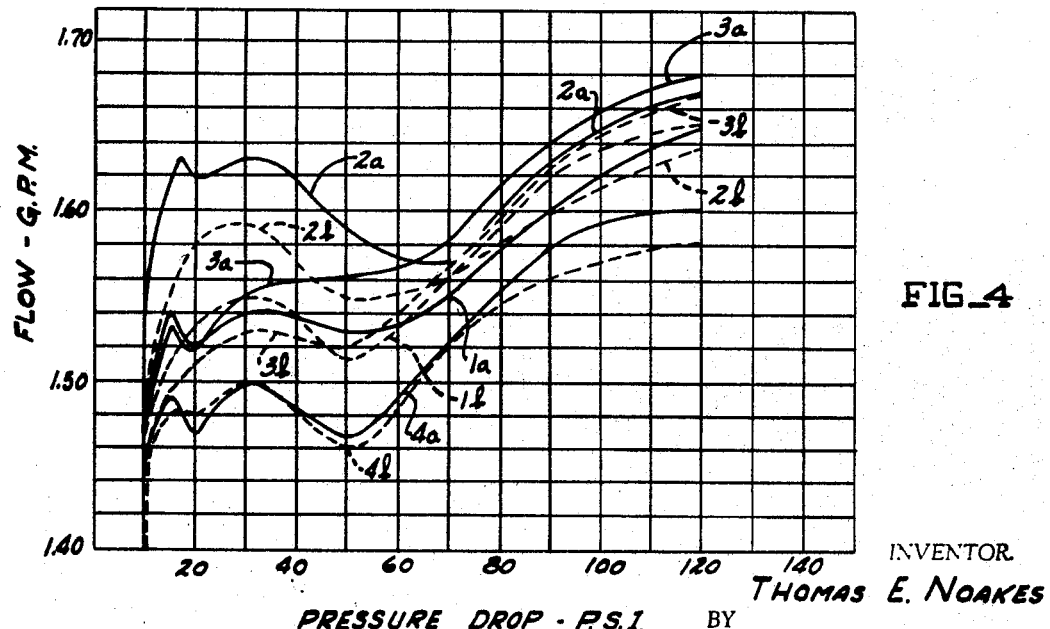
PRESSURE DROP - P.S.I.
INVENTOR.
THOMAS E. NOAKES
BY TENNES I. ERSTAD
JOHN E. McRAE
ATTORNEYS

United States Patent Office 3,474,831
Patented Oct. 28, 1969

3,474,831
ANTI-FRICTION SEAT FOR FLOW CONTROL
Thomas E. Noakes, 17201 Westmoreland,
Detroit, Mich. 48219
Filed Feb. 14, 1966, Ser. No. 527,200
Int. Cl. F15d 1/02
U.S. Cl. 138—43   3 Claims

ABSTRACT OF THE DISCLOSURE

Fluid flow control means for maintaining a substantially constant volumetric flow through a passage in spite of major variations in fluid supply pressure, comprising a resilient rubber disk element slidably positioned on a seat surface for controlled movement therealong as the fluid supply pressure deforms the rubber element to variably restrict the passage. The engagement of the rubber element and seat includes a film or coating of polytetrafluoroethylene for facilitating a smooth sliding action of the element without interruptions or discontinuities due to friction effects.

---

This invention relates to a control mechanism operable to maintain a substantially constant volumetric fluid flow in spite of substantial variations in fluid supply pressure. Mechanisms of this type commonly include an inlet chamber having an annular flat back surface constituting a seat for a rubber-like resilient member. The resilient member can have various configurations, as for example a circular imperforate disc with flow passages in its side and back surfaces, or a circular disc annulus having a central passage, with or without additional bypass passages in its side and back surfaces. When fluid flows against the face of the resilient member said member progressively flexes or deforms against the annular seat to reduce the size of the effective flow path in accordance with the supply pressure. The aim is to achieve a substantially constant volumetric flow through the mechanism in spite of varying supply pressures.

One object of the present invention is to provide a flow control mechanism which has a flow curve devoid of the abrupt deviations or dips caused by variable friction between the rubber member and its seat.

Another object is to provide a flow control mechanism which more nearly maintains a constant volumetric flow in spite of manufacturing inconsistencies in the resilient member.

A further object is to provide a flow control mechanism wherein resilient members received from the same mold cavity or different mold cavities have more nearly consistent performance characteristics.

In the drawings:

FIG. 1 is a sectional view through one embodiment of the invention taken on line 1—1 in FIG. 2.

FIG. 2 is a sectional view taken on line 2—2 in FIG. 1.

FIG. 3 is a sectional view taken on line 3—3 in FIG. 1.

FIG. 4 is a chart comparing the performance of various FIG. 1 flow controls with certain prior art flow controls.

FIG. 5 is a sectional view on line 5—5 in FIG. 6 illustrating another embodiment of the invention.

FIG. 6 is a sectional view on line 6—6 in FIG. 5.

Figure 7:
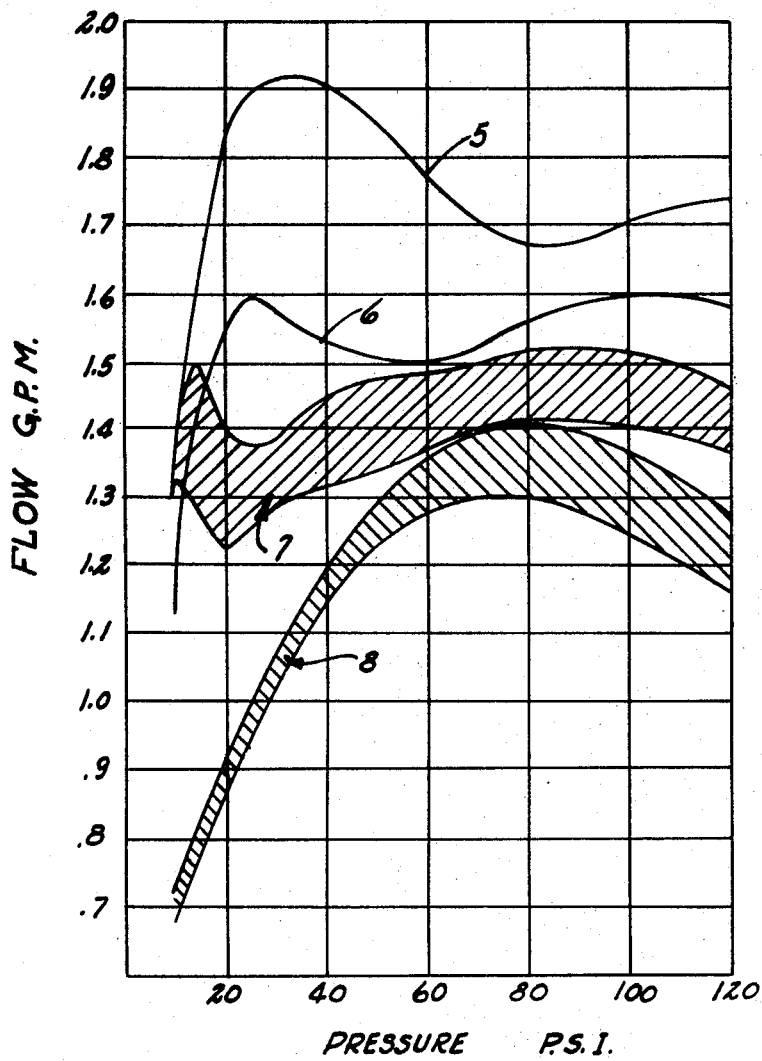
FIG. 7 is a second chart comparing the performance of illustrative forms of the invention with forms of the prior art.

FIGS. 1 through 3 show a flow control mechanism comprising a housing 10 having a generally cylindrical annular interior sidewall surface 12, and a back wall surface 14, said wall surfaces defining an inlet chamber 16 for accommodating a resilient rubber-like member 18.

When housing 10 is located in a liquid system the liquid pressure causes member 18 to deform toward back wall 14 to thus reduce the size of the flow passages formed in member 18. The object is to maintain a substantially constant volumetric flow through outlet opening 20 in spite of substantial variations in liquid supply pressure.

Resilient member 18 is constructed generally as shown in U.S. Patent 3,194,272 issued July 13, 1965 to Kogan et al. The member is provided with two sets of arcuate grooves 22 and 23 in its peripheral side surface 24, said grooves operating to conduct liquid from the space adjacent the upstream face 26 of member 18 to flow control passages 28 and 34 formed in the bottom face of the member. Control passage 28 is a wide shallow passage having a roof 30 and side surfaces 32. As shown in FIG. 1, passage 28 extends diametrically across the resilient member and interconnects the two passages 22. Thus, different portions of passage 28 are operable to conduct liquid from the respective grooves 22 to the outlet opening 20 formd in housing 10. The second control passage in member 18 is a triangular passage 34 extending diametrically across the resilient member between the two grooves 23. Thus, different portions of passage 34 are operable to conduct liquid from respective ones of grooves 23 to the outlet opening 20.

The respective passages 28 and 34 define four triangular feet 36 which bear on plastic disc 40 to support the resilient member at spaced points about its periphery. The liquid pressure in chamber 16 thus deforms member 18 principally in its central portion as shown for example in FIG. 4 of the aforementioned Patent 3,194,272. As the deformation proceeds the four triangular feet 36 tend to slide outwardly on the surface of antifriction disc or coating 40. I have found that an improved flow control action is achieved when wall 14 is covered by the anti-friction surface coating 40. The slippery seat surface provided by the disc or coating apparently allows feet 36 to slide outwardly smoothly and continuously rather than in spurts or short jerking movements. A suitable material for the anti-friction surface is polytetrafluoroethylene obtainable from E. I. du Pont de Nemours and Company under its trademark Teflon. The anti-friction surface can be formed by means of a polytetrafluoroethylene disc 40 positioned loosely on back wall 14, or by spray coating wall 14 with a polytetrafluoroethylene layer 40.

FIG. 4 shows illustrative performance of the FIG. 1 structure, with and without the polytetrafluoroethylene seat surface. Solid line curves 1a, 2a, 3a, and 4a show the performance of four different resilient members 18 taken from the same mold cavity and disposed in a brass housing 10 with feet 32 directly engaging wall 14. Wall 14 had a smoothly machined surface. Dotted line curves 1b, 2b, 3b and 4b show the performance of the same resilient members 18 when used in the same brass housing modified to have a spray coating 40 of polytetrafluoroethylene applied to back wall 14. Curves 1a and 1b are for devices using the same rubber sample, and so on for curves 2a, 2b, etc.

In the case of curves 1a, 2a, 3a, and 4a, as the pressure is increased from 0 p.s.i. to 15 p.s.i. resilient member 18 remains substantially rigid with little if any outward sliding movement of feet 36 on seat 14 or size reduction in passages 28 and 34. The feet apparently grip surface 14 without sliding outwardly. At about 15 p.s.i. the liquid pressure is apparently enough to abruptly slide feet 36 along surfaces 14, thus abruptly collapsing passage 28, consequently causing an abrupt decrease in flow. Thus, in the case of sample 1a the flow at 15 p.s.i. is about 1.54 gallons per minute while at 20 p.s.i. the flow drops down to about 1.52 gallons per minute. It is believed that this sharp decrease in flow is due to an abrupt outward sliding movement of feet 36 caused by a stress build-up in the rubber during the period when the pressure was increased from 0 to 15 p.s.i. The sharp flow decrease is eliminated by the present invention, as typified by samples 1b, 2b, 3b and 4b.

Referring now to curves 1b, 2b, 3b and 4b, as the pressure is increased to 15 p.s.i. the rubber member apparently undergoes some continuous deformation since the flow for each sample b is somewhat less than that for the corresponding sample a. Thus, for sample 2b the flow at 12 p.s.i. is about 1.52 gallons per minute whereas for sample 2a the flow is about 1.58 gallons per minute. Apparently the slippery seat surface 40 permits feet 36 to slide outwardly as the pressure increases from 10 to 15 p.s.i.

In the 15 to 20 p.s.i. range samples b have no flow drop similar to that which occurs with corresponding samples a. Thus, in the case of sample 1b the flow increases from about 1.51 gallons per minute at 15 p.s.i. to about 1.53 gallons per minute at 20 p.s.i. Apparently feet 36 undergo a substantially continuous outward sliding movement on anti-friction seat 40 as the pressure is raised from about 10 p.s.i. up through 20 p.s.i.

It will also be noted that the flow for samples 1b through 4b is substantially less than that for the corresponding samples 1a through 4a. Thus, in the case of sample 2a the flow at 15 p.s.i. is about 1.62 gallons per minute, whereas the flow for sample 2b at 15 p.s.i. is about 1.55 gallons per minute. The generally lower flows for curves b as compared with curves a reinforces the supposition that the sliding action of feet 36 is responsible for eliminating the dip in flow between 15 and 20 p.s.i.

As previously noted, curves 1a and 1b are for the same resilient member 18, differing only in the characteristic of the seat. Similarly curves 2a and 2b are for the same sample differing only in the seat, and so on with the other samples 3 and 4. One would expect approximately the same performance from each of the four samples when used on the same seat. However the curves are considerably different for the different samples 1a, 2a, 3a, and 4a. For example, at 20 p.s.i. sample 2a has a flow of 1.62 gallons per minute while sample 4a has a flow of only 1.47 gallons per minute. The .15 gallon per minute flow difference between samples 2a and 4a is considerably greater than the flow difference between samples 2b and 4b. Thus, at 20 p.s.i. sample 2b has a flow of 1.58 gallons per minute and sample 4b has a flow of 1.48 gallons per minute, giving a difference of only .10 gallon per minute.

In general the various curves 1b through 4b are closer together, particularly in pressure ranges below 60 p.s.i., than the corresponding samples 1a through 4a. The use of the anti-friction seat 40 is therefore believed tending to produce uniformity in performance among different samples taken from a given mold cavity. As might also be gathered, rubber members taken from different mold cavities have even greater tendency toward non-uniformity in performance than different members taken from the same mold cavity. The anti-friction seat thus is attractive as a device for securing performance uniformity with rubber members taken indiscriminately from different but nominally the same mold cavities at different times and subject to variations in curing and heat treat. If desired the anti-friction concept could be employed by coating the lower surfaces of feet 36 instead of the seat.

Referring now to FIG. 7, curve 5 shows the performance of a flow control member constructed as shown in FIGS. 1 through 3, said member having had its feet 36 deliberately bonded to the surface of a brass seat. Curve 6 shows the performance of the curve 5 sample, but without any bond between the rubber and brass surfaces. Comparison of curves 5 and 6 shows that bonding greatly limits the deformation of the rubber member necessary to restrict flow.

Still referring to FIG. 7, the cross-hatched area designated by numeral 7 represents the performance range of ten samples, all configured as shown in FIGS. 1 through 3, said samples being taken from four different mold cavities, and said samples being used on a seat formed of polyadipamide trademarked under the name Nylon. It will be seen that there is a drop in flow between 15 and 20 p.s.i., indicating a stress build-up below 15 p.s.i. and a fairly rapid outward sliding of feet 36 in the range between 15 and 20 p.s.i.

The cross-hatched area designated by numeral 8 in FIG. 7 represents the performance range of the ten samples of curve 7, but used on a seat formed by a disc of polytetrafluoroethylene. The flow is generally much lower and is devoid of the characteristic drop in the 15–20 p.s.i. range. Apparently the polytetrafluoroethylene provides for a much more pronounced sliding action than the polyadipamide. By using the polytetrafluoroethylene surface in combination with a different dimensioning of passage 30 and/or passage 34 it may be possible to greatly improve the flow curve over that illustrated.

Still referring to curves 7 and 8, it will be seen that the curve 8 performance band is much narrower than the curve 7 band, particularly below 60 p.s.i. This narrower band represents improved flow control uniformity from sample to sample, and is important from the quality control standpoint.

The anti-friction invention is believed useful in other flow control devices than that of FIG. 1. For example, the invention is believed applicable to the device of FIG. 6, which uses a rubber member 50 formed generally similarly to the corresponding member in U.S. Patent 2,936,790 issued May 17, 1960 to Dake et al. As shown in FIG. 6 member 50 is a rubber annulus having a central flow opening 52 and a series of flow grooves 54 in its peripheral side surface 56. The member is provided with six small cylindrical feet or buttons 58 which bear on the surface of anti-friction seat 40.

At low pressures in the neighborhood of 20 p.s.i. the annulus begins to flex toward seat 40, with frusto-conical surface 60 having a hinging motion about the bearing points 58. This flexing movement of the annulus is facilitated by an outward sliding movement of feet 58 on seat 40. By forming seat 40 of a material having a low coefficient of friction it is believed possible to prevent feet 58 from gripping the seat surface. It is thus believed possible to provide improved performance with less abrupt flow variations over the operating pressure range, and with less variation from sample to sample.

The distinguishing features of the invention are set forth in the accompanying claims.

I claim:

1. Flow control means for maintaining a substantially constant volumetric flow over a range of fluid supply pressures comprising a fluid flow inlet chamber means defined in part by a flat annular seat surface, said surface having an inner annular portion defining an outlet opening for the chamber means; a resilient rubber-like member located in the chamber means and biased against said seat surface by the pressure of fluid flowing toward the outlet opening; said resilient member having passage-forming surfaces therein operable to define at least one passage which varies in area inversely with the pressure drop across the member; said resilient member having a bearing surface slidably engaging the seat surface for outward radial sliding movements thereon as the fluid pressure deforms the member from its no-flow condition; at least one of said seat surface and bearing surface having an anti-friction surface character facilitating the sliding movements of the bearing portions; said one surface being formed of polytetrafluoroethylene.

2. The combination of claim 1 wherein said one surface is the seat surface.

3. The combination of claim 1 wherein said one surface is the bearing surface.

(References on following page)

References Cited

UNITED STATES PATENTS

| | | | |
|---|---|---|---|
| Re. 24,034 | 7/1955 | Smith | 138—45 X |
| 2,454,929 | 11/1948 | Kempton | 138—45 |
| 2,515,073 | 7/1950 | Binnall et al. | 138—45 |
| 2,632,476 | 3/1953 | Miller | 138—45 |
| 2,728,355 | 12/1955 | Dahl | 138—45 |
| 2,891,578 | 6/1959 | Dahl et al. | 138—45 |
| 2,899,979 | 8/1959 | Dahl et al. | 138—45 |
| 2,936,790 | 5/1960 | Dahl et al. | 138—46 |
| 3,194,272 | 7/1965 | Kogan et al. | 138—43 |
| 3,126,917 | 3/1964 | Hodgeman et al. | 138—44 |
| 2,881,015 | 4/1959 | Wahl | 277—96 |

OTHER REFERENCES

"Modern Plastics," vol. 30, December 1952, No. 4, pp. 79–80.

"Rulon® & Teflon®," Dixon Corporation, copyright 1964, Dixon Corporation, pp. 3, 7 and 8.

Chicago Tribune, "Teflon to Give Rockets Big Space Boost," Apr. 13, 1967, 138–178.

HOUSTON S. BELL, JR., Primary Examiner

U.S. Cl. X.R.

138—45, 46